US011930576B2

(12) United States Patent
Sueyasu

(10) Patent No.: US 11,930,576 B2
(45) Date of Patent: Mar. 12, 2024

(54) IMAGE FORMING DEVICE

(71) Applicant: BROTHER KOGYO KABUSHIKI KAISHA, Nagoya (JP)

(72) Inventor: Masato Sueyasu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/146,599

(22) Filed: Dec. 27, 2022

(65) Prior Publication Data

US 2023/0209684 A1 Jun. 29, 2023

(30) Foreign Application Priority Data

Dec. 28, 2021 (JP) ................................ 2021-214853

(51) Int. Cl.
*G03G 15/043* (2006.01)
*H05B 45/37* (2020.01)
*H05B 45/50* (2022.01)

(52) U.S. Cl.
CPC ........... *H05B 45/50* (2020.01); *G03G 15/043* (2013.01); *H05B 45/37* (2020.01)

(58) Field of Classification Search
CPC .................................................... G03G 15/043
USPC ...................................................... 399/38, 51
See application file for complete search history.

(56) References Cited

U.S. PATENT DOCUMENTS 11,112,721 B2 * 9/2021 Horiuchi .............. G03G 15/043
2009/0244567 A1 10/2009 Kusunoki

FOREIGN PATENT DOCUMENTS

JP 2008221721 * 9/2008
JP 2009-237946 A 10/2009

* cited by examiner

*Primary Examiner* — Hoan H Tran
(74) *Attorney, Agent, or Firm* — Merchant & Gould P.C.

(57) ABSTRACT

An image forming device includes an LED head, a main controller board and an LED controller board. The main controller board comprises a main controller, a voltage output circuit, a first voltage terminal, a second voltage terminal. The voltage output circuit outputs a first voltage via the first voltage terminal and the second voltage via the second voltage terminal. The LED controller board includes a third voltage terminal, a fourth voltage terminal and an LED controller. The third voltage terminal is connected to the first voltage terminal, and the fourth voltage terminal is connected to the second voltage terminal. The LED controller board outputs a voltage according to the first voltage to the LED head. The LED controller is connected to the fourth voltage terminal. A voltage according to the second voltage is input to the LED controller.

10 Claims, 7 Drawing Sheets

IMAGE FORMING DEVICE

REFERENCE TO RELATED APPLICATIONS

This application claims priority from Japanese Patent Application No. 2021-214853 filed on Dec. 28, 2021. The entire content of the priority application is incorporated herein by reference.

BACKGROUND ART

The present disclosures relate to an image forming device.

There has been known an image forming device provided with an LED (Light Emitting Diode) head configured expose a surface of a photosensitive drum to light, an LED control board having a sub-ASIC for controlling light emission of the LED head, and a main board having a main ASIC for controlling an exposure timing of the photosensitive drum.

DESCRIPTION

In the image forming device as mentioned above, when the main board outputs a voltage to the LED head via the LED control board, the voltage output from the main board to the LED control board is divided into two voltages, one of which is a voltage output to the LED head on the LED control board, and another of which a voltage for driving the sub-ASIC of the LED control board.

However, when exposing the surface of the photosensitive drum with the LED head, in order to increase the amount of light emitted by the LED head it may become necessary to apply a large current to the LED head. When the voltage input from the main board is divided into two systems on the LED control board, there could be a case where the voltage output to the LED head is unstable.

According to aspects of the present disclosures, there is provided an image forming device, comprising a photosensitive drum, an LED head configured to expose a surface of the photosensitive drum, a main controller board comprising a main controller, a voltage output circuit, a first voltage terminal, a second voltage terminal and a first input/output terminal connected to the main controller, the voltage output circuit being configured to output a first voltage via the first voltage terminal and the second voltage via the second voltage terminal, the first input/output terminal being configured to input and output a control signal, and an LED controller board comprising a third voltage terminal, a fourth voltage terminal, a second input/output terminal and an LED controller, the third voltage terminal being electrically connected to the first voltage terminal via a first wiring, the fourth voltage terminal being electrically connected to the second voltage terminal via a second wiring, the second input/output terminal being electrically connected to the first input/output terminal via a control wiring, the LED controller being configured to transmit and receive the control signal to and from the main controller via the second input/output terminal to control light emission of the LED head. The LED controller board is configured to output a voltage according to the first voltage input to the third voltage terminal to the LED head, the LED controller being electrically connected to the fourth voltage terminal, a voltage according to the second voltage input to the fourth voltage terminal being input to the LED controller.

FIG. 1 schematically shows a cross-sectional side view of an image forming device according to a first embodiment.

First Embodiment

Hereinafter, a first embodiment according to the present disclosures will be described.

Overall Configuration of Image Forming Device

Figure 1:
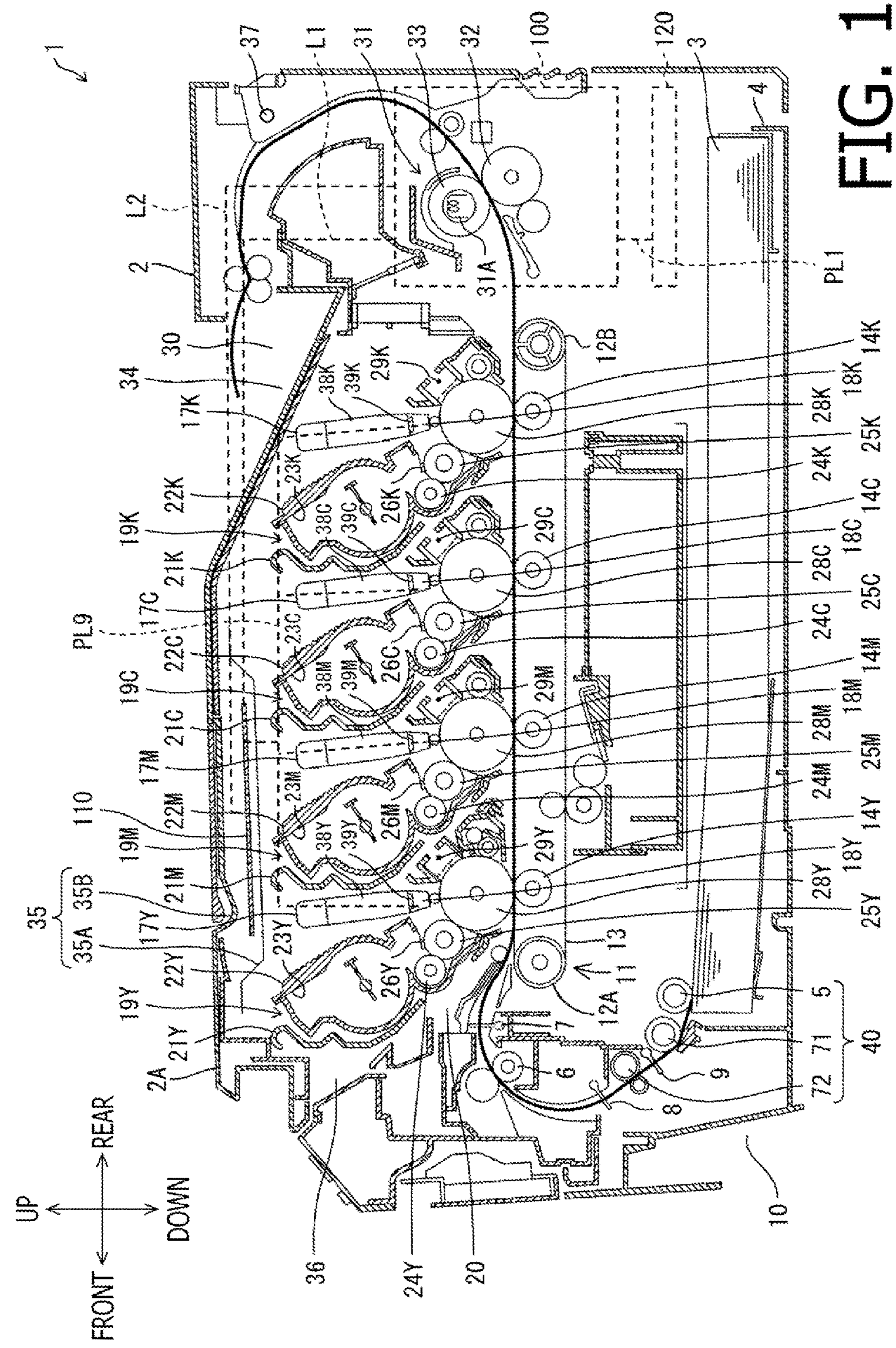

FIG. 1 schematically shows a cross-sectional side view of an image forming device 1 illustrating an internal configuration thereof. It is noted that, in the following description, directions "up," "down," "front," "rear," "right," and "left" correspond to those indicated by arrows in the accompanying drawings.

As shown in FIG. 1, the image forming device 1 is an LED printer configured to form color images using four colors of developing agents for Y (yellow), M (magenta), C (cyan) and K (black) colors.

Figure 2:
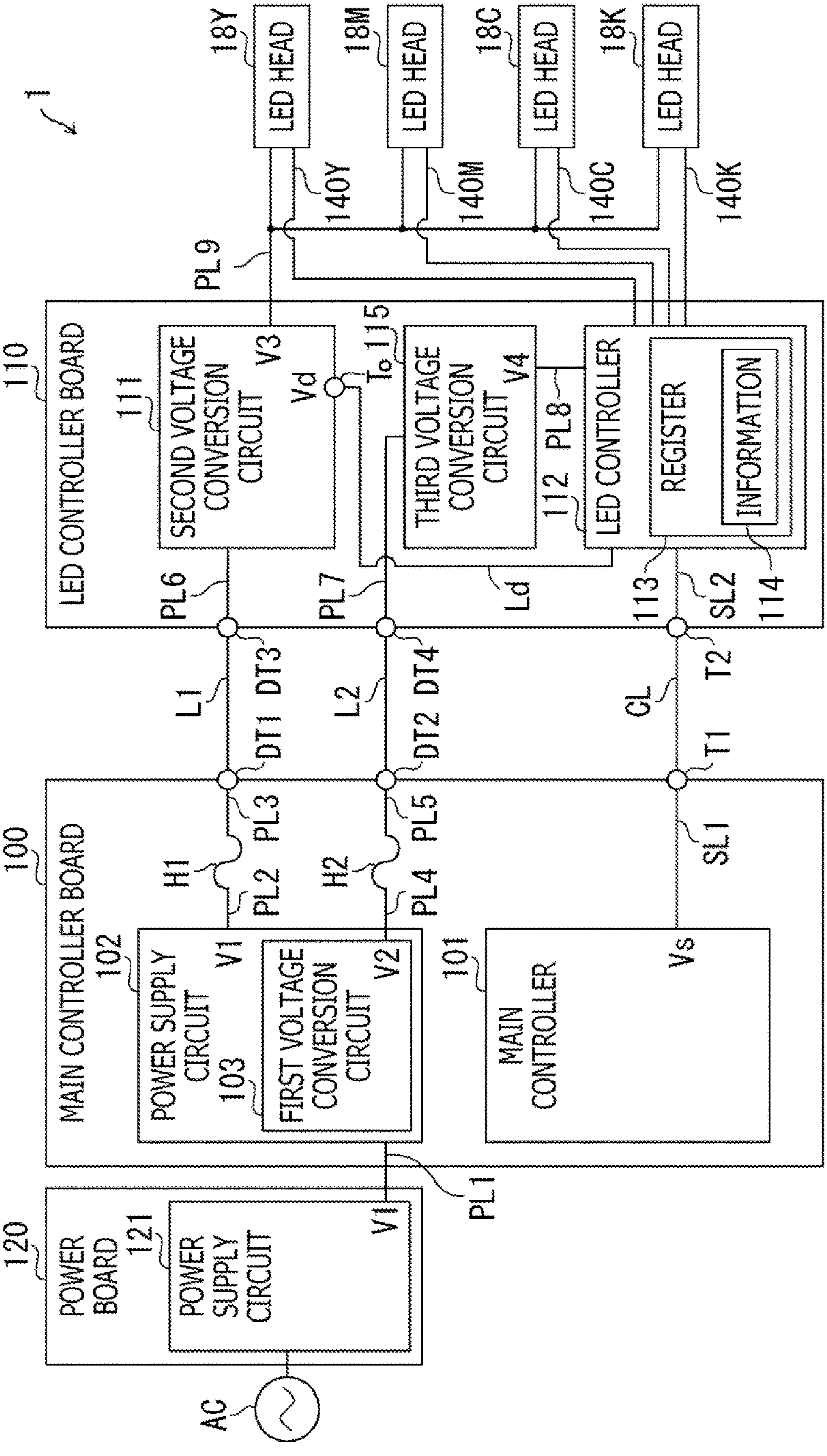
FIG. 2 is a block diagram showing an electrical configuration of the image forming device according to the first embodiment.
Figure 4:
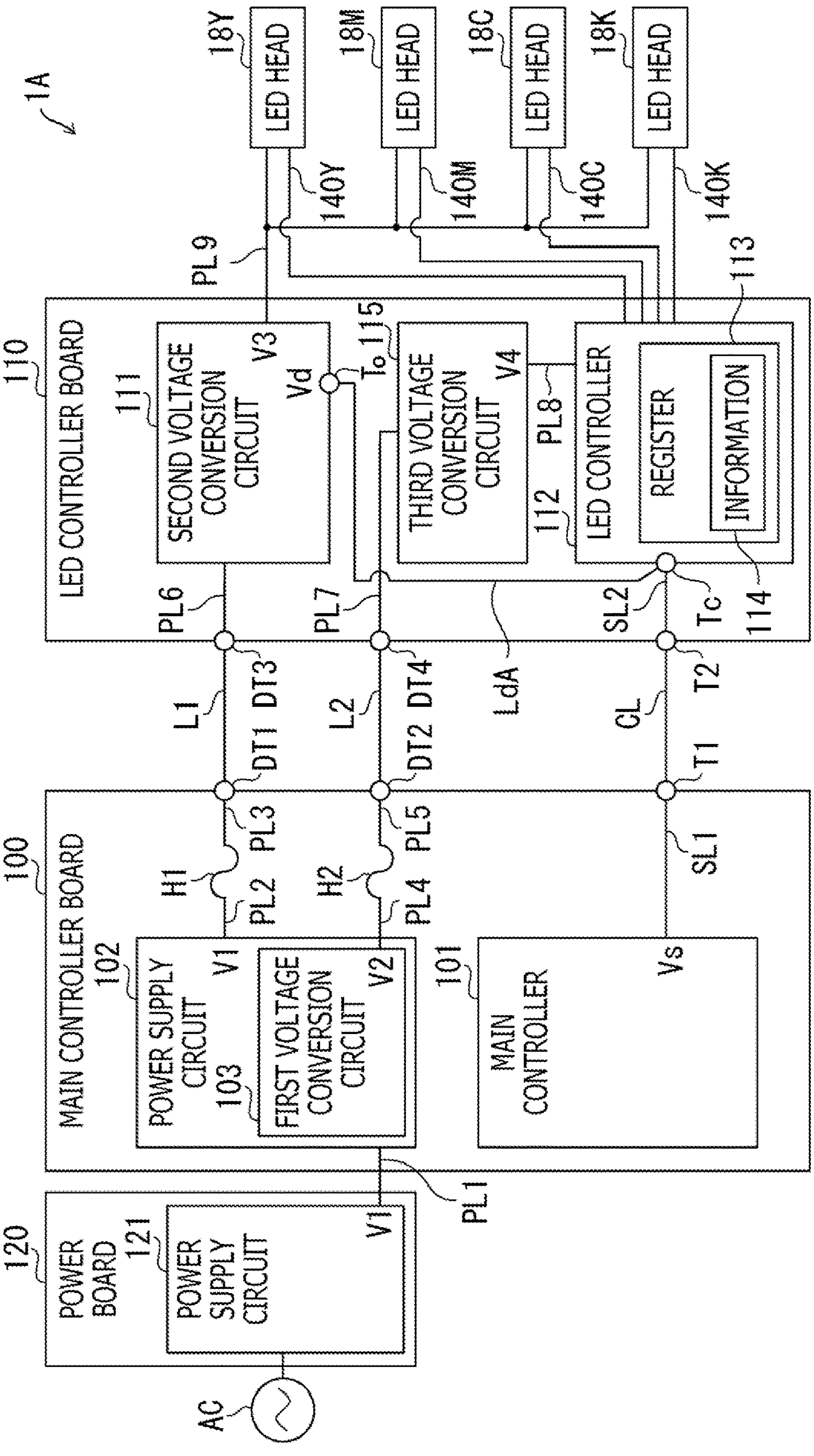
FIG. 4 is a block diagram showing an electrical configuration of an image forming device according to a modification of the first embodiment.

In the following description, when distinguishing each component by color, a letter "Y" for yellow, "M" for magenta, "C" for cyan, and "K" for black will be appended to the end of each component's reference number. Furthermore, when each component is not distinguished by color, the "Y," "M," "C," and "K" above, meaning each color, are omitted. In FIGS. 1, 2 and 4, each component is distinguished by color, and the above-mentioned "Y," "M," "C," and K" are appended at the end of each component.

The image forming device 1 is not limited to LED color printers, but can also be, for example, a laser color printer, a facsimile machine, or a so-called a multi-functional peripheral (MFP) having a printing function and a scanning function.

As shown in FIG. 1, the image forming device 1 has, in a housing 2, a sheet feeding device 10 configured to feed and convey a sheet 3, an image forming engine 20 configured to form an image on the sheet 3 as fed, a sheet ejecting mechanism configured to eject the sheet 3 on which the image has been formed, a main controller board 100 configured to control respective components when images are formed, an LED controller board configured to control respective LED heads 18Y, 18M, 18C and 18K, and a power supply board 120 configured to supply a direct current voltage to each component.

On an upper portion of the housing 2, an upper cover 2A, which is configured to open and close an opening 36 formed on the housing 2, is rotatably attached so as to rotate, mainly in an up-down direction, about a rotation shaft provided on a rear side (see FIG. 1). An upper surface of the upper cover 2A is an ejection tray 34 on which the sheets 3 ejected from the housing 2 are stacked. On a lower surface of the upper cover 2A, multiple holding members 39Y, 39M, 39C and 39K configured to hold exposure device 17Y, 17M, 17C and 17K, respectively, are provided. Further, in the upper cover 2A, a shield plate 35 is provided.

The shield plate 35 is configured to shield noises such as electromagnetic wave generated in the LED controller board 110. As shown in FIG. 1, the shield plate 35 includes an upper shield plate 35B facing the upper surface of the LED controller board 110 and a lower shield plate 35A facing a lower surface of the LED controller board 110.

The sheet feeding device 10 is provided to a lower portion inside the housing 2, and mainly includes a sheet feed tray 4 detachably attached to the housing 2, and a sheet supplying mechanism 40 configured to convey the sheet 3 from the sheet feed tray 4 to the image forming engine 20.

A pickup roller 5 is provided at an upper front end of the sheet feed tray 4. In association of rotation of the pickup roller 5, the uppermost sheet 3 among the sheet 3 stacked on the sheet feed tray 4 is fed to a separation roller 71.

The sheets 3 are separated one by one between the separation roller 71 and a separation pad not shown in the drawing, and are conveyed toward the conveyance roller 72. After a position of the front end of the sheet 3 is restricted by a registration roller 6 of which rotation is stopped, the sheet 3 is conveyed toward a transfer unit 11 via a conveyance path.

Along the conveyance path, there are provided a sheet feed sensor 9, a pre-registration sensor 8, and a post-registration sensor 7, which are configured to detect the passage of the sheet 3. The sheet feed sensor 9 is arranged on a downstream side, along the conveying direction of the sheet 3, with respect to the pickup roller 5 and the separation roller 71. The pre-registration sensor 8 is arranged on an upstream side, in the conveying direction of the sheet 3, with respect to the sheet feed sensor 9 and the conveyance roller 72, and on the upstream side with respect to the registration roller 6. The post-registration sensor 7 is arranged on the upstream side, in the conveying direction of the sheet 3, with respect to the registration roller 6 and on the upstream side with respect to the photosensitive drums 28Y-28K.

The image forming engine 20 mainly includes four exposure devices 17Y-17K (i.e., 17Y, 17M, 17C and 17K), four processing sections 19Y-19K, the transfer unit 11 and a fixing device 31. The exposure device 17Y-17K are arranged above the photosensitive drums 28Y-28K, respectively, and mainly include LED heads 18Y-18K and back plates 38Y-38K, respectively. The LED heads 18Y-18K are arranged to face the photosensitive drums 28Y-28K, respectively.

The transfer unit 11 is arranged between the sheet feeding device 10 and the processing sections 19Y-19K, and mainly includes a belt supporting roller 12A, a belt driving roller 12B, a belt 13 and transfer rollers 14Y-14K.

The transfer unit 11 is configured such that a ring-shaped belt (i.e., an endless belt) 13 is wound around the belt supporting roller 12A arranged on a front side and the belt driving roller 12B arranged on a rear side. On an inner side of the belt 13, the transfer rollers 14Y-14K are arranged to respectively face the photosensitive drums 28Y-28K, with the belt 13 therebetween. The transfer rollers 14Y-14K respectively correspond to the four processing sections 19Y-19K.

The belt driving roller 12B is connected via a gear mechanism, not shown, to a process motor, not shown, provided in the housing 2 in the state where the transfer unit 11 is attached to the housing 2. As the process motor power drives the belt driving roller 12B to rotate, the belt 13 moves in the clockwise direction as shown in the FIG. 1, thereby conveying the sheet 3 on the belt 13 rearward.

Above the transfer unit 11, four exposure devices 17Y-17K corresponding to the four processing sections 19Y-19K are arranged in the front-rear direction. The exposure devices 17Y-17K are supported by the lower surface of the upper cover 2A, and LED heads 18Y-18K each provided with linearly aligned multiple LESs are provided to lower end portions of the exposure device 17Y-17K, respectively. The exposure devices 17Y-17K are controlled to emit light based on the image data representing an image to be formed, and perform the exposure process by emitting, from each of the LED heads 18Y-18K, the LED light onto the surface of each of the photosensitive drums 28Y-28K on a line basis, that is, by scanning each photosensitive drum 28Y-28K line by line.

The processing sections 19Y-19K have cartridge frames 21Y-21K, developing cartridges 22Y-22K detachably attached to the cartridge frames 21Y-21K, the photosensitive drums 28Y-28K, and chargers 29Y-29K, respectively. When the upper cover 2A is opened, the exposure devices 17Y-17K move upward with the upper cover 2A, and the processing sections 19 become detachable from and attachable to the housing 2, individually.

The developing cartridges 22Y-22K have developing agent containers 23Y-23K configured to accommodate developing agents of respective colors. Further, the developing cartridges 22Y-22K have, on lower parts thereof, supplying rollers 24Y-24K, developing rollers 25Y-25K and thickness regulating blades 26Y-26K, respectively.

The developing agents output from the developing agent containers 23Y-23K are supplied onto the developing rollers 25Y-25K, respectively, by the rotation of the supplying rollers 24Y-24K, and are positively friction-charged between the supplying rollers 24Y-24K and the corresponding developing rollers 25Y-25K, respectively. Further, the developing agents supplied onto the developing rollers 25Y-25K penetrate between the thickness regulating blades 26Y-26K and the developing rollers 25Y-25K, respectively, as the developing rollers 25Y-25K rotate. Then, each developing agent is further friction-charged sufficiently, and held by each of the developing rollers 25Y-25K as a thin layer having a fixed thickness.

At lower parts of the cartridge frames 21Y-21K, the photosensitive drums 28Y-28K of which surfaces are covered by, for example, positively charged photosensitive layers, and electrostatic chargers 29Y-29K, respectively. When an image is formed, the photosensitive drums 28Y-28K are driven to rotate, and the surfaces of the photosensitive drums 28Y-28K are uniformly and positively charged by the electrostatic chargers 29Y-29K. The positively charged areas are then exposed to the scanning light emitted by the exposure devices 17Y-17K, thereby electrostatic latent images being formed on the surfaces of the photosensitive drums 28Y-28K.

Next, the positively charged developing agents carried by the developing roller 25Y-25K are supplied to the electrostatic latent image on the surfaces of the photosensitive drums 28Y-28K, respectively, thereby the electrostatic latent images on the surfaces of the photosensitive drums 28Y-28K being made visible (i.e., the electrostatic latent image being developed). The developing agent images carried on the surfaces of the photosensitive drums 28Y-28K are then sequentially transferred onto the sheet 3 by the negative polarity transfer voltage applied to the transfer rollers 14Y-14K while the sheet 3 passes through the nip position between each of the photosensitive drum 28Y-28K and the corresponding transfer roller 14Y-14K. The sheet 3 on which the developing agent image has been transferred is then conveyed to the fixing device 31, which is equipped with a heater 31A.

The fixing device 31 has a heating roller 33 provided with the heater 31A and a pressure roller 32 configured to press the sheet 3 toward the heating roller 33 to heat and fix the developing agent image transferred on the sheet 3 to the surface of the sheet. After that, the sheet 3, on which the developing agent image has been thermally fixed by the fixing device 31, is conveyed upward and stacked on the ejection tray 34 on the upper surface of the upper cover 2A.

The power supply board 120 is electrically connected to the main controller board 100 via the power supply line PL1. The main controller board 100 is electrically connected to the LED controller board 110 via a first wiring L1. Further, the main controller board 100 is also electrically connected to the LED controller board 110 via a second wiring L2. The LED controller board 110 is electrically connected to each of LED heads 18Y-18K via a power supply line PL9.

Electrical Configuration of Image Forming Device

FIG. 2 is a block diagram showing an electrical configuration of the image forming device according to a first embodiment. The main controller board 100 has a first voltage terminal DT1, a second voltage terminal DT2, a first fuse H1, a second fuse H2, a voltage output circuit 102, a main controller 101, and a first I/O (input/output) terminal T1. The voltage output circuit 102 has a first voltage conversion circuit 103.

The LED controller board 110 has a third voltage terminal DT3, a fourth voltage terminal DT4, a second voltage conversion circuit 111, a third voltage conversion circuit 115, an LED controller 112, and a second I/O (input/output) terminal T2. The second voltage conversion circuit 111 has a detection signal output terminal configured to output a detection signal Vd which will be described later. The LED controller 112 further includes a register 113. The register 113 is a storage element used for calculation processing and holding an execution state of the LED controller 112. The register 113 is configured to store information 114 which will be described later.

The power supply board 120 has a power supply circuit 121.

The power supply circuit 121 is configured to receive an alternate voltage of an external commercial power supply AC and generate a first voltage V1. The power supply circuit 121 then outputs the first voltage V1 to the voltage output circuit 102.

The first voltage conversion circuit 103 is configured to convert the first voltage V1 to a second voltage V2.

The voltage output circuit 102 is configured to output the first voltage V1 and the second voltage V2. The voltage output circuit 102 outputs the first voltage V1 to the first fuse H1, and the second voltage V to the second fuse H2, respectively.

The first fuse H1 is disconnected when a current flowing via the first fuse H1 based on the first voltage V1 is equal to or greater than a particular value. In this way, overcurrent due to a circuit failure or a short circuit in the circuit will not flow to each of the LED heads 18Y-18K.

The second fuse H2 is disconnected when a current flowing via the second fuse H2 based on the second voltage V2 is equal to or greater than a particular value. In this way, overcurrent due to a circuit failure or a short circuit will not flow in the LED controller 112.

The main controller 101 is configured to transmit and receive a control signal Vs to and from the LED controller 112 via a control wiring CL. For example, the control signal Vs is a signal instructing the start of light emission control of the LED heads 18Y-18K at a timing when the image formation is performed.

The second voltage conversion circuit 111 is configured to convert the first voltage V1 to a third voltage V3. When the third voltage V3 is less than a particular voltage, the second voltage conversion circuit 111 outputs a detection signal Vd, which is a "Low" signal, from the detection signal output terminal To.

The detection signal Vd is input to the LED controller 112. The detection signal Vd is stored in the register 113 of the LED controller 112 as information 114 indicating whether the detection signal Vd is the "Low" signal.

The second voltage conversion circuit 111 outputs the third voltage V3 to each of the LED heads 18Y-18K.

Each of the LED heads 18Y-18K is driven by the third voltage V3.

The third voltage conversion circuit 115 converts the second voltage V2 to a fourth voltage V4. The third voltage conversion circuit 115 outputs the fourth voltage V4 to the LED controller 112.

The LED controller 112 is driven by the fourth voltage V4.

The LED controller 112 is configured to transmit/receive signals to control light emission of each of the LED heads 18Y-18K. The LED controller 112 transmits the information 114 indicating whether the detection signal Vd stored in the register 113 is the "Low" signal or not to the main controller 101. In this way, the main controller 101 obtains the information 114 indicating whether the detection signal Vd is the "Low" signal or not.

The power supply circuit 121 is electrically connected to the voltage output circuit 102 via the power supply line PL1. The voltage output circuit 102 is electrically connected to the first fuse H1 via the power supply line PL2. Furthermore, the voltage output circuit 102 is electrically connected to the second fuse H2 via the power supply line PL4.

The first fuse H1 is electrically connected to the first voltage terminal DT1 via the power supply line PL3. The first voltage terminal DT1 is electrically connected to the third voltage terminal DT3 via the first wiring L1. The third voltage terminal DT3 is electrically connected to the second voltage conversion circuit 111 via the power supply line PL6. The second voltage conversion circuit 111 is electrically connected to each of the LED heads 18Y-18K via the power supply line PL9. The second fuse H2 is connected to the second voltage terminal DT2 via the power supply line PL5. The second voltage terminal DT2 is electrically connected to the fourth voltage terminal DT4 via the second wiring L2. The fourth voltage terminal DT4 is electrically connected to the third voltage conversion circuit 115 via the power supply line PL7.

The third voltage conversion circuit 115 is electrically connected to the LED controller 112 via the power supply line PL8. The main controller 101 is electrically connected to the first I/O terminal T1 via the signal line SL1. The first I/O terminal T1 is electrically connected to the second I/O terminal T2 via the control wiring CL. The second I/O terminal T2 is electrically connected to the LED controller 112 via the signal line SL2. The LED controller 112 electrically connects among the LED heads 18Y-18K via the flat cables 140Y-140K. The detection signal output terminal To is electrically connected to the LED controller 112 via the detection signal line Ld.

Detection Process for Power Supply to LED Heads

Figure 3:
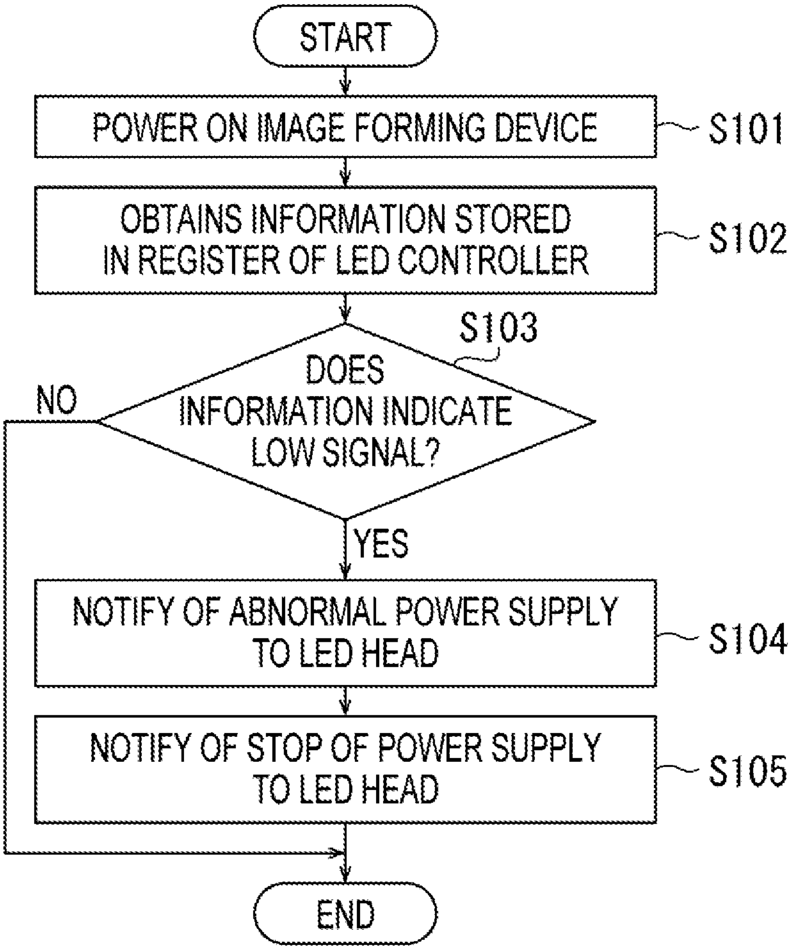
FIG. 3 is a flowchart illustrating a power supply detecting and controlling process according to the first embodiment.

FIG. 3 shows a flowchart illustrating a process for detecting the power supply to the LED heads 18Y-18K of the image forming device 1 in accordance with embodiment 1 of the present disclosure. When the first wiring L1 is poorly wired due to a broken first fuse H1 or a poor connection of the first wiring, the power is not supplied to each of the LED heads 18Y-18K. On the other hand, when power is supplied to the second wiring L2, the LED controller 112 is driven. Therefore, there is a case where the LED controller 112 is driven at the timing to execute image formation but the LED heads 18Y-18K are not driven and no image is formed on the sheet 3.

As the third voltage V3 is less than the predetermined voltage, the main controller 101 detects that power is not being supplied to the LED heads 18Y-18K. Then, the main controller 101 notifies the user that power is not being supplied to the LED heads 18Y-18K and controls the LED controller 112 to stop supplying power to the LED heads 18Y-18K.

The detection control of the power supply to the LED heads 18Y-18K is performed at a timing when the image forming is not performed. This timing is, for example, a timing when the power of the image forming device 1 is turned ON but the image formation has not yet been performed.

Firstly, the detection control of the power supply to the LED heads 18Y-18K is started.

In S101, the main controller 101 powers ON the image forming device 1. Then, the main controller 101 proceeds to S102.

In S102, the main controller 101 obtains, from the LED controller 112, the information stored in the register 113 of the LED controller 112.

In S103, the main controller 101 determines whether the information 114 is information indicating that the detection signal Vd is the "Low" signal. When the information 114 is the information indicating that the detection signal Vd is the "Low" signal (S103: YES), the main controller 101 proceeds to S104. When the information 114 is not the information indicating that the detection signal Vd is the "Low" signal (S103: NO), the main controller 101 terminates the process.

In S104, the main controller 101 determines that the third voltage V3 is less than a particular voltage necessary for driving the LED heads 18Y-18K, and notifies the user that the power supply to the LED heads 18Y-18K is in an abnormal state. Then, the main controller 101 proceeds to S105. The notification of the abnormal power supply to the LED heads 18Y-18K is done, for example, by displaying an error message on a display (not shown) of the image forming device.

In S105, the main controller 101 stops supplying the power to the LED controller 112. Concretely, the main controller 101 stops driving the third voltage conversion circuit 115 for generating the fourth voltage V4 to be output to the LED controller 112. Alternatively, the main controller 101 stops driving the first voltage conversion circuit 103 for generating the second voltage V2 to be output to the third voltage conversion circuit 115. In this way, the main controller terminates the processes.

Effects

The main controller board 100 includes the voltage output circuit 102 configured to output the first voltage V1 and the second voltage V2. A voltage according to the first voltage V1 output from the main controller board 100 is applied to the LED heads 18Y-18K via the first wiring L1 and the LED controller board 110. A voltage according to the second voltage V2 output from the main controller board 100 is applied to the LED controller 112 via the second wiring L2.

In this way, on the main controller board 100 of the image forming device 1, a voltage is divided into the two voltages applied to the LED controller 112 and the LED heads 18Y-18K. Even when the voltage necessary for driving the LED heads 18Y-18K increases, the stabilized voltage can be supplied from the LED controller board 110 to the LED heads 18Y-18K.

The power supply circuit 121 on the power supply board 120 is configured to convert the alternate current voltage from the external commercial power supply AC to the first voltage V1. The first voltage conversion circuit 103 of the voltage output circuit 102 converts the first voltage V1 output from the power supply circuit 121 to the second voltage V2.

In this way, the image forming device 1 is able to convert the alternate current voltage input from the external commercial power supply AC to a direct current voltage with the power supply circuit 121 of the power supply board 120. Then, it becomes possible that the direct current voltage is divided into two voltages on the main controller board 100, and the two voltages are converted to respective direct current voltages and input to the LED controller 112 and the LED heads 18Y-18K, respectively.

When the third voltage V3, which is less than the particular voltage, is output to the LED heads 18, the detection signal Vd output from the second voltage conversion circuit 111 to the LED controller 112 becomes the "Low" signal. The main controller 101 obtains the information 114 indicating whether the detection signal Vd is the "Low" signal from the LED controller 112. The main controller 101 detects whether the third voltage V3 output to the LED heads 18Y-18K is less than the particular voltage, thereby detecting an error that the third voltage V3 is not output to the LED heads 18Y-18K due to wiring failure such as blown-out of a fuse.

The third voltage conversion circuit 115 converts the second voltage V2 to the fourth voltage V4, and outputs the same to the LED controller 112. In this way, the voltage necessary to drive the LED controller 112 is supplied to the LED controller 112.

The LED controller 112 stores, in the register 113, the information 114 indicating whether the detection signal Vd is the "Low" signal, and the main controller 101 obtains the information 114 indicating whether the detection signal Vd is the "Low" signal and stored in the register 113. In this way, the main controller 101 detects whether the third voltage V3 output to the LED heads 18Y-18K is less than the particular voltage, and detects errors in which the third voltage V3 is not output to the LED heads 18Y-18K due to wiring failure such as blown-out of a fuse.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification of First Embodiment

A modification of the present embodiment will be described below. For the sake of convenience of explanation, members that have the same functions as those described in the above embodiments are indicated with the same symbols/reference numerals, and their descriptions will not be repeated.

FIG. 4 is a block diagram showing an electric configuration of an image forming device 1A which is a modification of the above-described first embodiment. In the modification, the LED controller 112 has a common terminal Tc to which both the detection signal Vd and the control signal Vs are input. A detection signal output terminal To that outputs the detection signal Vd is electrically connected to the common terminal TC via a detection signal line LtA. The main controller 101 is configured in such a manner that the control signal Vs is input to the common terminal Tc via a signal line SL1, a first I/O terminal T1, a control wiring CL, a second I/O terminal T2, and a signal line SL2.

To the common terminal Tc of the LED controller 112, the detection signal Vd is input from the second voltage conversion circuit 111 at a timing when the image formation is not performed. On the other hand, to the common terminal Tc of the LED controller 112, the control signal Vs which is used when the image formation is performed is input from the main controller 101 at a timing when the image formation is performed.

The LED controller 112 obtains the detection signal Vd from the common terminal TC at a timing when the image formation is not performed, while obtains the control signal Vs at a timing when the image formation is performed.

Since the terminals for inputting the detection signal Vd to the LED controller 112 and the control signal Vs to the LED controller 112 are common, the number of terminals through which signals are input to the LED controller 112 can be reduced.

At a timing when the image formation is being executed, the control signal Vs to be output to the LED controller 112 from the main controller 101 is a signal instructing the start of light emission control of the LED heads 18Y-18K.

At a timing when the image formation is not performed, the LED controller 112 obtains the detection signal Vd from the second voltage conversion circuit 111. At a timing when the image formation is performed, the LED controller 112 obtains, from the main controller 101, the control signal Vs which is a signal instructing the start of light emission control of the LED heads 18Y-18K.

As described above, in the image forming device 1A, the terminal through which the detection signal Vd is input to the LED controller 112 and the terminal through which the control signal Vs is input to the LED controller 112 are made common, thereby reducing the number of terminals through which signals are input to the LED controller 112.

Second Embodiment

A second embodiment according to the present disclosures will be described. For the sake of convenience of explanation, members having the same functions as those described in the above embodiment will be indicated with the same symbols/reference numerals, and their descriptions will not be repeated.

Figure 5:
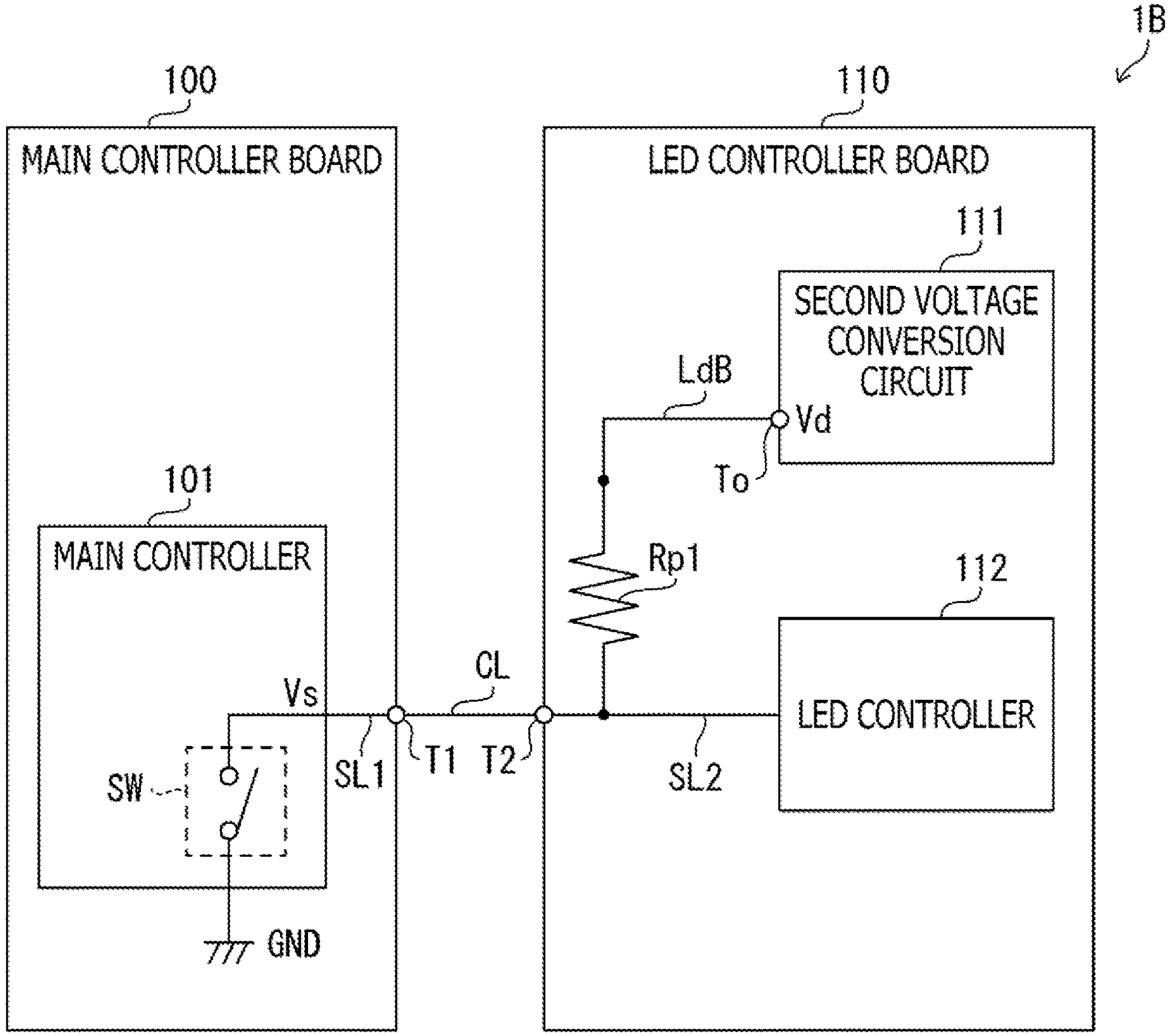
FIG. 5 is a wiring diagram showing an electrical configuration of the image forming device according to a second embodiment.

FIG. 5 shows a wiring diagram showing an electrical configuration of a portion of the imaging device 1B according to a second embodiment of the present disclosures. According to the second embodiment, the detection signal Vd of the second voltage conversion circuit 111 is "High" when the third voltage V3 is equal to or greater than a particular voltage necessary for driving the LED heads 18Y-18K. When the detection signal Vd of the second voltage conversion circuit 111 is the "Low" signal when the third voltage V3 is less than the particular voltage necessary for driving the LED heads 18Y-18K.

The LED controller board 110 has a pull-up resistor Rp1, one end of which is electrically connected to a control wiring CL and the other end of which is electrically connected to the detection signal output terminal To via a detection signal line LdB. The main controller 101 has a switching element SW one end of which is electrically grounded and the other end of which is electrically connected to the first I/O terminal T1 via the signal line SL1.

In a case where the detection signal Vd is the "High" signal, when the switching element SW is in an ON state, the "Low" signal is input to the LED controller 112, while when the switching element SW is in the "OFF" state, the "High" signal is input to the LED controller 112. On the other hand, in a case where the detection signal Vd is the "Low" signal, the "Low" signal is input to the LED controller 112 regardless of the "ON" or "OFF" state of the switching element SW.

By electrically connecting one end of the pull-up resistor Rp1 to the control wiring CL and by electrically connecting the other end of the pull-up resistor Rp1 to the detection signal output terminal To, the "High" signal output by the detection signal output terminal To serves as the "reference voltage" function. When the "Low" signal is detected from the LED controller 112 when the switching element SW is in an "OFF" state, the detection signal Vd is the "Low" signal. Then, the main controller 1010 obtains the information 114 indicating whether the detection signal Vd is "Low" signal or not from the LED controller 112. In this way, the main controller 101 detects whether the third voltage V3 output to the LED heads 18Y-18K, thereby detecting an error that the third voltage V3 is not output to the LED heads 18Y-18K due to wiring failure such as blown-out of a fuse.

Third Embodiment

A third embodiment according to the present disclosures will be described. For the sake of convenience of explanation, members having the same functions as those described in the above embodiment will be indicated with the same symbols/reference numerals, and their descriptions will not be repeated.

Figure 6:
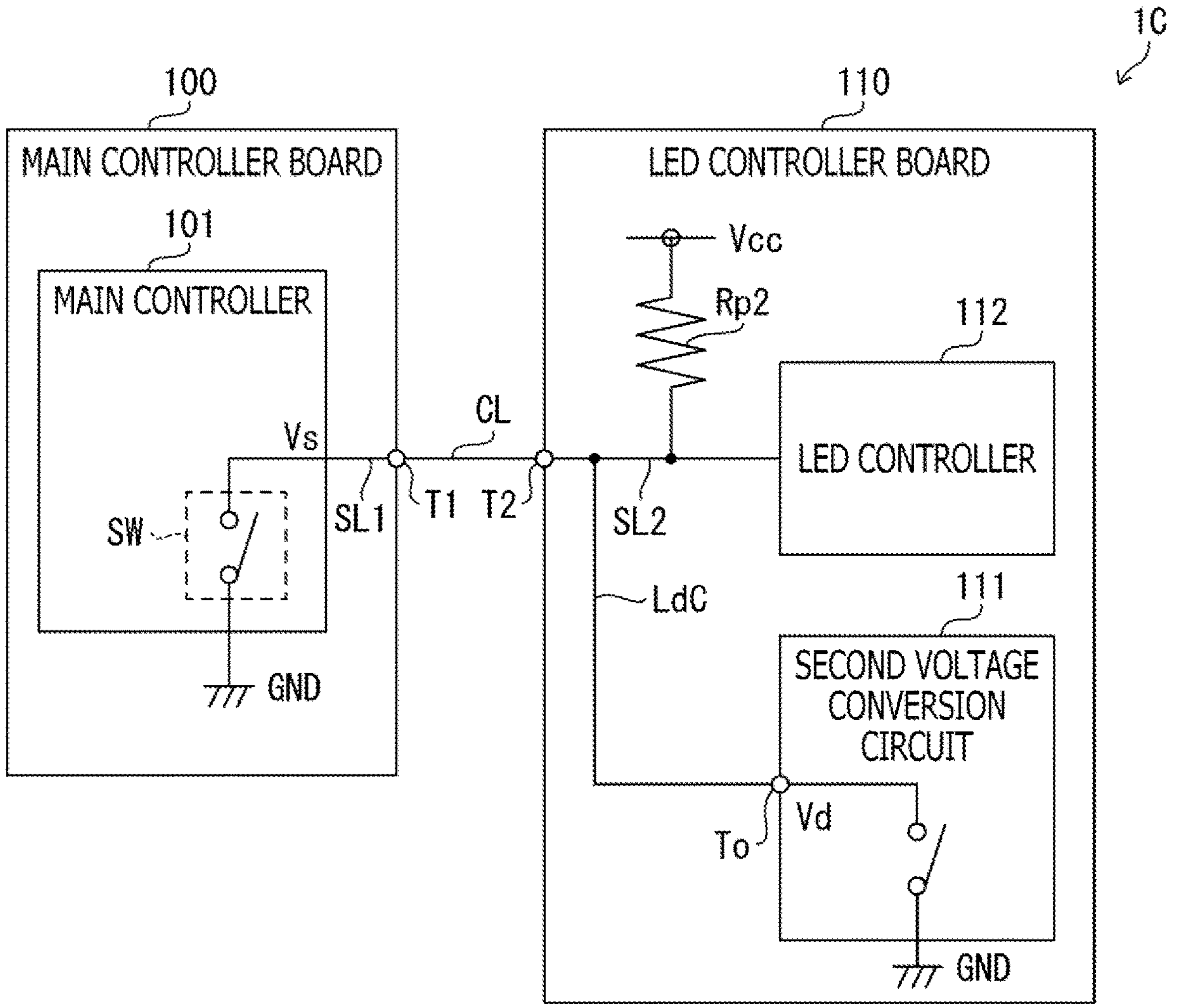
FIG. 6 is a wiring diagram showing an electrical configuration of the image forming device according to a third embodiment.

FIG. 6 is a wiring diagram showing an electrical configuration of a portion of an image forming device 1C according to the third embodiment. The detection signal output terminal To of the second voltage conversion circuit 111 exhibits high impedance when the third voltage V3 is equal to or greater than a particular voltage necessary for driving the LED heads 18Y-18K. When the third voltage V3 is less than the particular voltage necessary for driving the LED heads 18Y-18K the detection signal output terminal To of the second voltage conversion circuit 111 outputs the "Low" signal.

The meaning of the detection signal output terminal To exhibiting the high impedance is that the impedance between the detection signal output terminal To and the ground (GND) is extremely high. When the detection signal output terminal To exhibits the high impedance, only a weak current flows in the detection signal line LdC, and the detection signal Vd is no longer output from the detection signal output terminal To.

The meaning of the "Low" signal being output from the detection signal output terminal To is that the detection signal output terminal To is in a state to be grounded (GND). In this state, the voltage of the detection signal output terminal To is the "Low" level.

The LED controller board 110 has a pull-up resistor Rp2. One end of the pull-up resistor Rp2 is electrically connected to the control wiring C1, and the other end of the pull-up resistor Rp2 is electrically connected to the reference voltage Vcc. The detection signal output terminal To is electrically connected to the control wiring CL via the detection signal line LdC. The main controller 101 has the switching element SW, which is grounded at one end and electrically connected to the first input/output terminal T1 at the other end via the signal line SL1.

In a state where the detection signal output terminal To exhibits the high impedance, when the switching element SW is in an ON state, the "Low" signal is input to the LED controller 112, while when the switching element SW is in an OFF state, the "HIgh" signal is input to the LED controller 112. On the other hand, in a state where the detection signal output terminal To outputs the "Low" signal, the "Low" signal is input to the LED controller 112 regardless of whether the switching element SW is in the ON state or the OFF state.

As shown in FIG. 6, one end of the pull-up resistor Rp2 is electrically connected to the control wiring CL, and the other end of the pull-up resistor Rp2 is electrically connected to the reference voltage Vcc. When the "Low" signal is detected from the LED controller 112 in a state where the switching element SW is in the OFF state, the detection signal Vd is the "Low" signal. The main controller 101 obtains the information 114 indicating whether the detection signal Vd is the "Low" signal or not from the LED controller 112. In this way, the main controller 101 detects whether the third voltage V3 output to the LED heads 18Y-18K is less than the particular voltage, thereby detecting an error that third voltage V3 is not output to the LED heads 18Y-18K due to wiring failure such as blown-out of a fuse.

Modification of Third Embodiment

A modification of the third embodiment will be described below. For the sake of convenience of explanation, members that have the same functions as those described in the above embodiments are indicated with the same symbols/reference numerals, and their descriptions will not be repeated.

Figure 7:
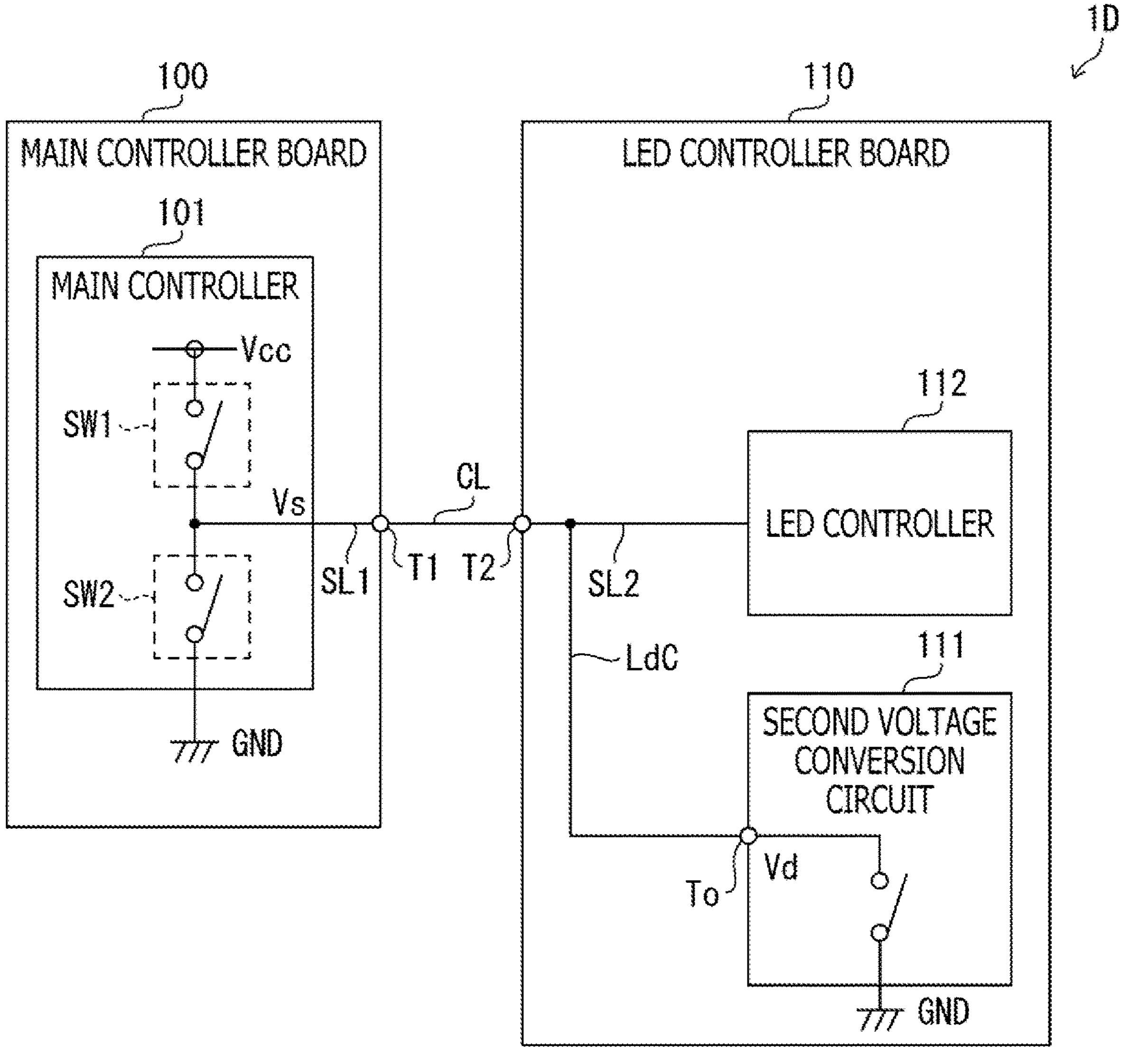
FIG. 7 is a wiring diagram showing an electrical configuration of the image forming device according to a modification of the third embodiment.

FIG. 7 is a wiring diagram showing an electrical configuration of a portion of an image forming device 1D according to a modification of the third embodiment. The detection signal output terminal To of the second voltage conversion circuit 111 exhibits high impedance when the third voltage V3 is equal to or greater than a particular voltage necessary for driving the LED heads 18Y-18K. When the third voltage V3 is less than the particular voltage necessary for driving the LED heads 18Y-18K, the detection signal output terminal To of the second voltage conversion circuit 111 outputs the "Low" signal.

The detection signal output terminal To is electrically connected to the control wiring CL via the detection signal line LdC. The main controller 101 has a first switching element SW1 and a second switching element SW2. One end of the first switching element SW1 is connected to the reference voltage Vcc, the other end of the first switching element SW1 and one end of the second switching element SW2 are electrically connected serially, and further electrically connected to the control wiring CL. The other end of the second switching element SW2 is electrically grounded.

When the first switching element SW1 is in an ON state, the second switching element SW2 is in an OFF state, while when the first switching element SW1 is in the OFF state, the second switching element SW2 is in the ON state.

In a state where the first switching element SW1 is in an ON state and the second switching element SW2 is in an OFF state, the "Low" signal is input to the LED controller 112 when the detection signal output terminal To outputs the "Low" signal, and the "High" signal is input to the LED controller 112 when the detection signal output terminal To exhibits the high impedance.

As shown in FIG. 7, one end of the first switching element SW1 is connected to the reference voltage Vcc. In a state where the first switching element SW1 is in the ON state and the second switching element SW2 is in the OFF state, when the "Low" signal is detected from the LED controller 112, the detection signal Vd is the "Low" signal. The main controller 101 obtains the information 114 indicating whether the detection signal Vd is the "Low" signal or not from the LED controller 112. In this way, the main controller 101 detects whether the third voltage V3 output to the LED heads 18Y-18K is less than the particular voltage, thereby detecting an error that third voltage V3 is not output to the LED heads 18Y-18K due to wiring failure such as blown-out of a fuse.

In a state where the first switching element SW1 is in the OFF state and the second switching element is in the ON state, the "Low" signal is input to the LED controller 112 regardless whither the detection signal output terminal To outputs the "Low" signal or exhibits the high impedance. When the control signal Vs is the "Low" signal and at a timing when the image formation is not performed, a state that the first switching element SW1 is in the OFF state and the second switching element SW2 is in the ON state will not be employed.

The present disclosure is not limited to the embodiments/modifications described above, and various changes are possible within the scope of the claims, and embodiments obtained by combining technical means disclosed in the different embodiments/modifications as appropriate are also included within the technical scope of the present disclosures.

What is claimed is:

1. An image forming device, comprising:

a photosensitive drum;

an LED head configured to expose a surface of the photosensitive drum;

a main controller board comprising a main controller, a voltage output circuit, a first voltage terminal, a second voltage terminal and a first input/output terminal connected to the main controller, the voltage output circuit being configured to output a first voltage via the first voltage terminal and a second voltage via the second voltage terminal, the first input/output terminal being configured to input and output a control signal; and an LED controller board comprising a third voltage terminal, a fourth voltage terminal, a second input/output terminal and an LED controller, the third voltage terminal being electrically connected to the first voltage terminal via a first wiring, the fourth voltage terminal being electrically connected to the second voltage terminal via a second wiring, the second input/output terminal being electrically connected to the first input/output terminal via a control wiring, the LED controller being configured to transmit and receive the control signal to and from the main controller via the second input/output terminal to control light emission of the LED head, wherein the LED controller board is configured to output a voltage according to the first voltage input to the third voltage terminal to the LED head, the LED controller being electrically connected to the fourth voltage terminal, a voltage according to the second voltage input to the fourth voltage terminal being input to the LED controller.

2. The image forming device according to claim 1, further comprising a power supply board, wherein the power supply board comprises a power supply circuit configured to convert an alternate current voltage input from an external commercial power supply to the first voltage which is a direct current voltage, and wherein the voltage output circuit comprises a first voltage conversion circuit configured to convert the first voltage to the second voltage and output the second voltage to the second voltage terminal.

3. The image forming device according to claim 1, wherein the LED controller board further comprises a second voltage conversion circuit electrically connected between the third voltage terminal and the LED head, wherein the second voltage conversion circuit is configured to:

convert the first voltage to a third voltage and output the third voltage to the LED head; and output a Low signal, as a detection signal, to the LED controller in a case where the third voltage is less than a particular voltage necessary for driving the LED head, and wherein the main controller is configured to obtain information indicating whether the detection signal is the Low signal from the LED controller via the control wiring and detect whether the third voltage is less than the particular voltage.

4. The image forming device according to claim 3, wherein the LED controller board further comprises a third voltage conversion circuit configured to:

convert the second voltage input to the fourth voltage terminal to a fourth voltage; and output the fourth voltage to the LED controller.

5. The image forming device according to claim 3, wherein the LED controller comprises a common terminal, both the detection signal and the control signal being input to the common terminal, wherein the detection signal is input to the common terminal of the LED controller from the second voltage conversion circuit at a timing when an image formation is not performed; and wherein the control signal used for the image formation is input to the common terminal of the LED controller from the main controller at a timing when the image formation is performed.

6. The image forming device according to claim 5, wherein the control signal, which is input to the LED controller from the main controller at the timing when the image formation is performed, is a signal of instructing to start controlling of the light emission of the LED head.

7. The image forming device according to claim 3, wherein the second voltage conversion circuit comprises a detection signal output terminal configured to output the detection signal, wherein the second voltage conversion circuit is configured to output a High signal, as the detection signal, when the third voltage is equal to or greater than the particular voltage necessary for driving the LED head, wherein the LED controller board comprises a pull-up resistor, end of the pull-up resistor being electrically connected to the control wiring, an other end of the pull-up resistor being electrically connected to the detection signal output terminal, wherein the main controller comprises a switching element, one end of the switching element being grounded, an other end of the switching element being electrically connected to the detection signal output terminal, wherein, in a case where the detection signal is the High signal:

the Low signal is input to the LED controller when the switching element is in an ON state; and the High signal is input to the LED controller when the switching element is in an OFF state, and wherein, in a case where the detection signal is the Low signal, the Low signal is input to the LED controller regardless of whether the switching element is in the ON state or the OFF state.

8. The image forming device according to claim 3, wherein the second voltage conversion circuit comprises a detection signal output terminal configured to output the detection signal, wherein the detection signal output terminal of the second voltage conversion circuit exhibits high impedance, when the third voltage is equal to or greater than the particular voltage necessary for driving the LED head, wherein the LED controller board comprises a pull-up resistor, end of the pull-up resistor being electrically connected to the control wiring, an other end of the pull-up resistor being electrically connected to the detection signal output terminal, wherein the main controller comprises a switching element, one end of the switching element being grounded, an other end of the switching element being electrically connected to the detection signal output terminal, wherein, in a case where the detection signal output terminal exhibits high impedance:

the Low signal is input to the LED controller when the switching element is in an ON state; and the High signal is input to the LED controller when the switching element is in an OFF state, and wherein, in a case where the detection signal is the Low signal, the Low signal is input to the LED controller regardless of whether the switching element is in the ON state or the OFF state.

9. The image forming device according to claim 3, wherein the second voltage conversion circuit comprises a detection signal output terminal configured to output the detection signal, wherein the detection signal output terminal of the second voltage conversion circuit exhibits high impedance, when the third voltage is equal to or greater than the particular voltage necessary for driving the LED head, wherein the detection signal output terminal is electrically connected to the control wiring, wherein the main controller comprises a first switching element and a second switching element, one end of the first switching element being connected to a reference voltage, an other end of the first switching element being electrically connected to one end of the second switching element serially, the other end of the first switching element being electrically connected to the control wiring, an other end of the second switching element being grounded, the second switching element being in an OFF state when the first switching element is in an ON state, the second switching element being in an ON state when the first switching element is in an OFF state, wherein, in a case where the first switching element is in an ON state and the second switching element is in an OFF state, the Low signal is input to the LED controller when the detection signal output terminal outputs the Low signal; and the High signal is input to the LED controller when the detection signal output terminal exhibits high impedance.

10. The image forming device according to claim 3, wherein the LED controller comprises a register configured to store information indicating whether the detection signal is the Low signal, and wherein the main controller is configured to obtain the information stored in the register via the control wiring.

* * * * *